Dec. 31, 1929.   C. A. DIETERICH   1,741,506
BUMPER FOR MOTOR VEHICLES
Filed July 26, 1928
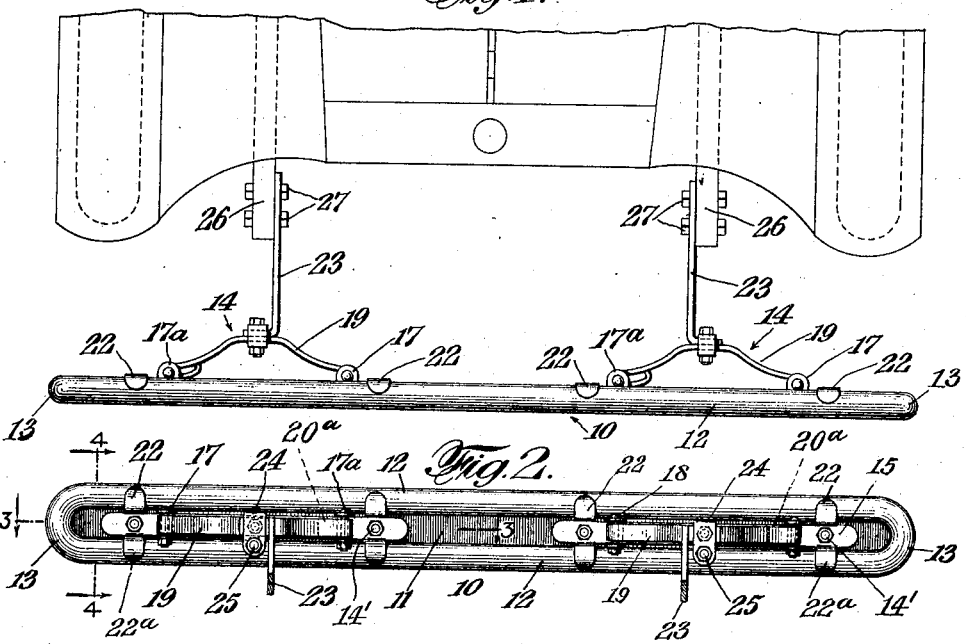
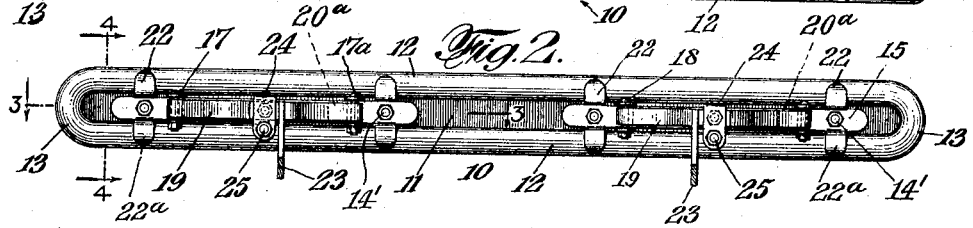
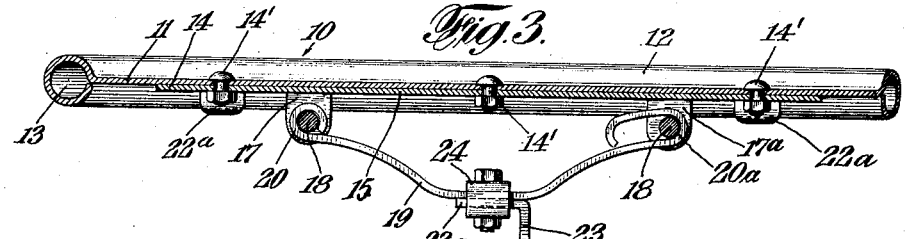
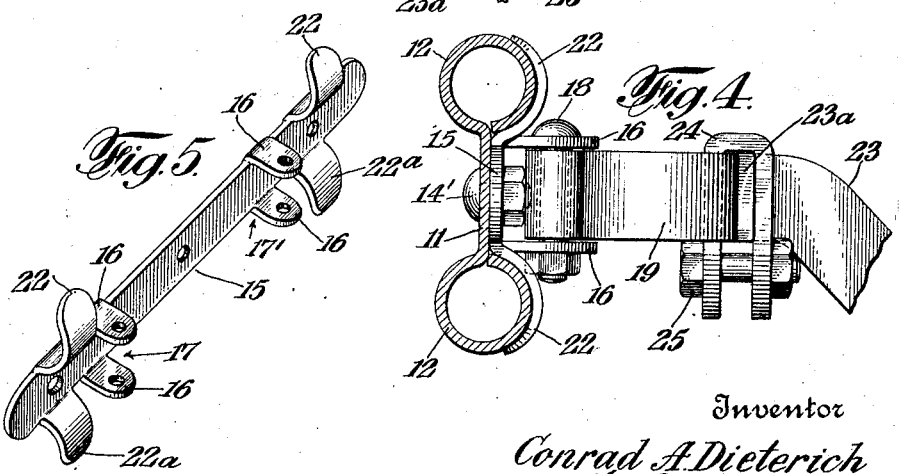
Inventor
Conrad A. Dieterich
By his Attorney Patented Dec. 31, 1929

1,741,506

UNITED STATES PATENT OFFICE

CONRAD A. DIETERICH, OF MOUNT VERNON, NEW YORK

BUMPER FOR MOTOR VEHICLES

Application filed July 26, 1928. Serial No. 295,402.

My invention relates to improvements in bumpers for vehicles, and the same has for its object more particularly to provide a simple, efficient and inexpensive mounting or supporting means for securing the impact receiving member of a bumper in position upon a motor vehicle.

Further, said invention has for its object to provide a yielding support for bumpers which may be readily interposed between the fender bar and the vehicle body or frame.

Further, said invention has for its object to provide a support for securing a fender bar in position upon a vehicle, which support will also serve to reinforce or brace said fender bar.

Further, said invention has for its object to provide a support more particularly designed for securing fender bars of the rigid type yieldingly in position upon the vehicle so as to prevent the fender bar being unduly injured by contact with an object in the path of the vehicle.

Further, said invention has for its object to provide a supporting element or unit adapted to be secured directly to a fender bar and serving as a means to reinforce said fender bar, and at the same time providing means for supporting a resilient member in position to yieldingly resist the rearward movement of said fender bar when the same strikes an object in the path of the vehicle.

Further, said invention has for its object to provide means in the form of a spring unit which may be readily attached to the rear of a fender bar and serve to yieldingly support the bar in position upon the vehicle, and at the same time serve to reinforce or brace the fender bar at a plurality of points in order to protect the same against unnecessary injury or damage which might otherwise result from the impact of the fender bar with an object in the path of the vehicle.

Other objects will in part be obvious and in part be pointed out hereinafter.

To the attainment of the aforesaid objects and ends my invention consists in the novel features of construction, and in the combination, connection and arrangement of parts hereinafter more fully described, and then pointed out in the claims.

In the accompanying drawings,

Figure 1 is a plan or top view showing the front end of a motor vehicle and one form of bumper embodying my invention applied thereto;

Fig. 2 is a rear view of the bumper bar and supporting means secured thereto;

Fig. 3 is an enlarged detail horizontal section on the line 3—3 of Fig. 2 showing a portion of the fender bar, and one of the supporting devices therefor;

Fig. 4 is an enlarged vertical section on the line 4—4 of Fig. 2, and

Fig. 5 is an enlarged detail perspective view of the attaching member or plate without the spring.

In said drawings 10 designates a fender bar of the type shown in the application of Thomas D. Finizio, filed May 25, 1927, Serial No. 193,956, in which the bar is produced or shaped from a piece of sheet metal, and comprises a longitudinal intermediate portion 11, which may be flat, bowed or of any other desired shape, and provided along its longitudinal edges with tubular rim portions 12, merging at their corresponding ends in semi-circular end portions 13.

14, 14 denote a pair of supporting elements or units which are secured to the rear side of the fender bar 10, adjacent to the opposite ends thereof by bolts 14′, 14′ extending through said elements and the fender bar. Each element or unit 14 is preferably made as an integral structure and comprises a substantially flat, longitudinal plate 15 which is preferably of such shape and width that the same will readily fit between the tubular rim portions 12, and lie flush against the rear side of the intermediate portion 11 of the bar 10.

Each longitudinal plate 15 is provided along its opposite longitudinal edges adjacent to its ends with integral outwardly-extending projections 16, arranged in pairs, and forming bearings 17, 17ª in which are disposed bolts or pins 18. 19 denotes a bow spring having one end provided with an eye or loop 20 embracing the pin 18 extending through one pair of said bearings 17, and having its other end provided with an elongated eye or loop 20ª which slidably engages with the pin 18 extending through the bearing 17ª adjacent to the other end of the longitudinal plate 15.

Each longitudinal plate 15 is further provided upon its upper longitudinal edge with upwardly extending projections 22, 22, and along its lower longitudinal edge with correspondingly located similar projections 22ª, 22ª. The projections 22, 22ª are located between the ends of said longitudinal plate 15 and the bearings 17, 17ª thereof, and are curved to conform to and engage closely with the rear sides of the tubular rim portions 12 of the particular form of fender bar 10 illustrated, and serve to brace or reinforce the bar at said points in order to protect or strengthen the bar so that the same will not be readily and unnecessarily injured or deformed by the impact of the bumper with an object in the path of the vehicle.

23 denotes brackets or arms which may be of any suitable shape or form. In the present instance each bracket or arm is shown provided with an angular front end 23ª embraced by a U-shape clamping member 24. The clamping member 24 also embraces the bow spring 19 midway of its ends, and the several parts are rigidly secured to adjusted position by a bolt 25 passing through the free ends of said clamping member 24. The inner or rear ends of the brackets or arms 23 may be secured to the forward ends of the vehicle frame members 26 by bolts 27, or in any other suitable or convenient manner.

The operation of the bumper will be obvious from the foregoing description. It need only be noted that when the bow springs 19, flatten as a result of the impact of the fender bar 10 with an object, the thrust exerted by the ends of the springs will be received by the opposite end portions of the longitudinal plates 15 adjacent to the bracing or reinforcing members 22, 22ª, and be transmitted to the rear sides of the intermediate portion 11 and the tubular rim portions 12 12 of the fender bar.

It will, of course, be understood that the invention is not limited to the specific form of fender bar hereinabove indicated and described, which form is only for the purposes of illustration, and that the same may be readily adapted to fender bars of various shapes and types.

Having thus described my said invention what I claim and desire to secure by Letters Patent is:

1. The combination of a fender bar with a spring support comprising a member adapted for securement to said bar, attaching means on said member, a resilient member engaged by said attaching means, and means secured to said resilient member for supporting said bar, substantially as specified.

2. In a bumper for vehicles, a fender bar, a support comprising a longitudinal member adapted for securement to said bar, a resilient member, means for securing said resilient member to said longitudinal member adjacent to the ends thereof, and means secured to said resilient member for supporting said bar, substantially as specified.

3. In a bumper for vehicles, a fender bar, a support comprising a relatively narrow longitudinal member adapted for securement to said bar, securing means adjacent to the opposite ends of said support, a resilient member secured at its ends to the securing means on said member, and means secured to said resilient member intermediate the ends thereof for supporting said bar in position upon a vehicle, substantially as specified.

4. In a bumper for vehicles, a fender bar, a support comprising a relatively-narrow longitudinal member adapted for securement to said bar, bearing members extending from said longitudinal member adjacent the ends thereof, a spring having its ends secured to said bearing members, and means secured to said spring intermediate the ends thereof, for supporting said bar in position upon a vehicle, substantially as specified.

5. In a bumper for vehicles, a fender bar, a supporting element comprising a relatively narrow longitudinal member adapted for securement to said bar, a pair of bearing members extending laterally from said longitudinal member adjacent the ends thereof, a bow-spring having each of its ends secured within one pair of said bearing members, and a supporting arm secured to said bow-spring intermediate the ends thereof, substantially as specified.

6. In a bumper for vehicles, a fender bar, an attaching element comprising a relatively narrow longitudinal plate adapted for securement to said bar, a pair of ears extending laterally from said longitudinal element adjacent the opposite ends thereof, a bow spring having each of its ends secured within one pair of said ears, and one of the ends of said spring movably arranged with respect to its respective pair of ears, and a supporting arm secured at one end to said bow-spring intermediate the ends thereof, substantially as specified.

7. In a bumper for vehicles, a fender bar including a pair of parallel, longitudinal marginal portions disposed in spaced relation, an attaching element comprising a relatively narrow, longitudinal plate adapted for securement to said bar intermediate the marginal portions thereof, a pair of bearing members extending from said longitudinal member adjacent to the opposite ends thereof, reinforcing members extending transversely from the opposite longitudinal edges of said longitudinal plate and engaging the marginal portions of said bar, a bow-spring having each of its ends secured within one pair of said ears, and one of the ends of said spring movably arranged with respect to its respective pair of ears, and a supporting arm secured at one end to said bow-spring intermediate the ends thereof, substantially as specified.

8. In a bumper for vehicles a fender bar, a support comprising a longitudinal plate, a plurality of reinforcing members extending laterally from the opposite longitudinal edges of said plate and adapted to engage said fender bar, a resilient member, and means for securing said resilient member to said longitudinal plate adjacent to its opposite ends, substantially as specified.

9. In a bumper for vehicles a fender bar, a support comprising a longitudinal plate, means for securing the same to said fender bar, a plurality of reinforcing members arranged in pairs and extending laterally from the opposite longitudinal edges of said plate, bearings extending outwardly from said plate adjacent to the opposite ends thereof, and a resilient member having its ends secured within said bearings, substantially as specified.

10. In a bumper for vehicles a fender bar, a support comprising a longitudinal plate, means for securing the same to said fender bar, a plurality of reinforcing members extending laterally from the opposite longitudinal edges of said plate and adapted to engage with said fender bar, bearings extending rearwardly from said plate adjacent to said reinforcing members, and a spring member having its ends secured within said bearings, substantially as specified.

11. In a bumper for vehicles a fender bar, a support comprising a longitudinal plate, means for securing the same to said fender bar, a plurality of reinforcing members extending laterally from the opposite longitudinal edges of said plate and adapted to engage with said fender bar, bearings extending rearwardly from said plate adjacent to said reinforcing members, a spring member having its ends secured within said bearings, and means engaging said spring for supporting the fender bar in position upon a vehicle, substantially as specified.

12. In a bumper for vehicles, a fender bar, a support comprising a longitudinal plate, means for securing the same to said fender bar intermediate the longitudinal edges thereof, a plurality of reinforcing members extending laterally from the opposite longitudinal edges of said plate and adapted to engage with the marginal portions of said fender bar, bearings extending rearwardly from said plate at points adjacent to and inwardly of said reinforcing members, and a curved spring member having its ends secured within said bearings, substantially as specified.

13. In a bumper for vehicles, a fender bar, a plurality of supporting elements each comprising a longitudinal plate, means for securing the same lengthwise to said fender bar, a plurality of reinforcing members extending laterally from the opposite longitudinal edges of said plate and adapted to engage with said fender bar adjacent to the marginal portions thereof, bearings extending outwardly from said plate adjacent to the opposite ends thereof, a bow-spring having its ends secured within said bearings, and means severally engaging said bow-springs for supporting the fender bar in position upon a vehicle, substantially as specified.

14. In a bumper, a supporting element formed as an integral structure comprising a longitudinal plate adapted for securement to a fender bar, a plurality of reinforcing members extending laterally from the opposite longitudinal edges of said plate, and a plurality of bearing members extending outwardly at right angles to the plane of said plate, substantially as specified.

15. In a bumper, a supporting element formed as an integral structure comprising a longitudinal plate adapted for securement to a fender bar, a pair of reinforcing members extending laterally from the opposite longitudinal edges of said plate and adjacent to the ends thereof, and a plurality of bearing members extending outwardly at right angles to the plane of said plate and adjacent to and inwardly of said reinforcing members, substantially as specified.

16. In a bumper, a supporting element comprising a longitudinal plate adapted for securement to a fender bar, a plurality of reinforcing members extending laterally from the opposite longitudinal edges of said plate, and a bearing extending outwardly from said plate, substantially as specified.

17. In a bumper, a supporting element comprising a longitudinal plate adapted for securement to a fender bar, a plurality of reinforcing members extending laterally from the opposite longitudinal edges of said plate, and a bearing extending outwardly from said plate at right angles to the plane thereof, substantially as specified.

18. In a bumper, a supporting element comprising a longitudinal plate adapted for securement to a fender bar, a plurality of reinforcing members extending laterally from the opposite longitudinal edges of said plate adjacent to the ends thereof, and a bearing extending outwardly from said plate intermediate said reinforcing members, substantially as specified.

Signed at the city of New York, in the county and State of New York, this 24th day of July, one thousand nine hundred and twenty-eight.

CONRAD A. DIETERICH.